United States Patent Office 3,025,827
Patented Mar. 20, 1962

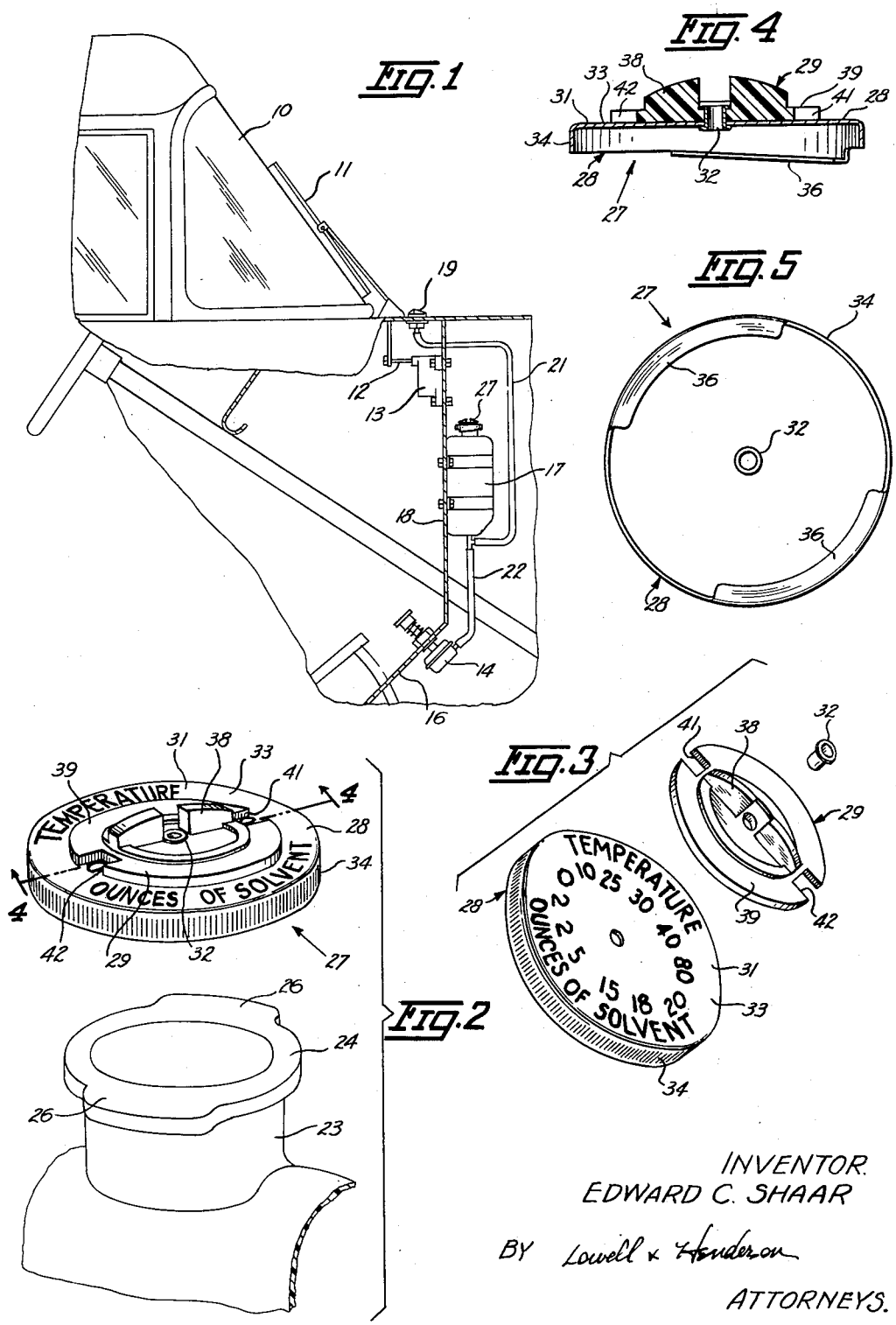

3,025,827
CLEANING SOLVENT RESERVOIR CAP
Edward C. Shaar, Detroit, Mich., assignor to The Delman Company, Cookeville, Tenn., a corporation of Tennessee
Filed Sept. 6, 1960, Ser. No. 54,170
2 Claims. (Cl. 116—133)

This invention relates to a reservoir for the washer unit of an automotive windshield cleaning system and more particularly to a filler cap for the reservoir.

For the most efficient utilization of an automotive windshield cleaning system using water, the addition to the water of a certain amount of an all-purpose anti-freeze and bug solvent has been found to be most effective. This requires that the operator or the person servicing the cleaning system have knowledge of the proper amount of solvent to add to the water in the system, depending upon the outside temperature.

It is an object, therefore, of this invention to provide a novel filler cap for the windshield cleaning solvent reservoir which includes a dial arrangement for visibly indicating the proper amount of solvent to be added to the water in the reservoir according to the outside temperature.

Another object of this invention is to provide an economical, easily readable calculating device in the form of a filler cap for the reservoir, whereby one can readily ascertain how much solvent to add to the reservoir water according to the general weather conditions of driving.

A further object of this invention is to provide a temperature-solvent indicating device in the form of a reservoir filler cap where only corresponding indicia which are pertinent are visible at one time, and wherein by merely turning a dial part of the cap, other combinations of pertinent corresponding indicia are visible.

These objects, and other features and advantages of this invention will become readily apparent by reference to the following description and the accompanying drawings, wherein:

FIG. 1 is a fragmentary sectional view of an automobile showing a windshield clearing system embodying the reservoir filler cap of this invention;

FIG. 2 is an enlarged, exploded perspective view showing the filler cap and neck portion of the reservoir;

FIG. 3 is an enlarged, exploded perspective view of the filler cap;

FIG. 4 is a cross section view taken along the line 4—4 in FIG. 2; and

FIG. 5 is an enlarged bottom plan view of the filler cap.

Referring now to the drawings, there is illustrated in FIG. 1 a windshield clearing system as applied to an automobile having a windshield 10, a wiper 11 therefor operated through linkage 12 by a wiper motor 13. The clearing system includes a pump unit 14 mounted on the vehicle floorboard 16, a fluid reservoir 17 mounted on the firewall 18, a nozzle 19 through which the fluid is sprayed onto the windshield 10, and fluid transmitting conduits 21 and 22 interconnecting the unit 14, reservoir 17, and nozzle 19.

For the purpose of filling the reservoir 17 with cleaning fluid, such as water and some type of cleaning solvent, the reservoir is provided with an open filler neck 23 (FIG. 2) having a flat face portion 24 with a pair of arcuate, diametrically opposed segmented ears 26. To close the filler neck 23, a cap 27 (FIG. 2) is provided and to which this invention is particularly directed.

The cap 27 includes a circular cover 28 (FIGS. 3–5) and a circular dial member 29 rotatably mounted concentrically on the face 31 (FIG. 4) of the cover 28 by a pin or rivet 32. The cover 28 comprises a flat top wall 33 having a depending flange 34 about the periphery thereof. Extended inwardly from the base of the flange 34, are a pair of arcuate, diametrically opposed segmental portions 36 (FIGS. 4 and 5). The purpose for the portions 36 may readily be seen as that of rotatably engaging the underside of the ears 26 (FIG. 2) of the reservoir filler neck 23, thereby securing the cover 28 tightly to the filler neck face 24 and closing off the opening of the neck 23.

On the face 31 (FIG. 3) of the cover 28, the word "Temperature" is imprinted, along with arcuately spaced temperature indicia extended clockwise from "0" to and including "80." These numbers are abbreviations for degree Fahrenheit; for example, "80" indicates 80° F. to the person filling the reservoir 17. Diametrically opposite the word "Temperature" and the indicia therefor, the word "Ounces of Solvent" are imprinted on the cover face 31, along with arcuately spaced solvent indicia extending counterclockwise from the first number "2" of two thereof to and including "20." It is thus apparent, for example, that the number "15" directly above the imprinted "Ounce of Solvent" words is indicative of 15 ounces of solvent. Each temperature indicium or number is diametrically opposite a solvent indicium or number which is corresponding thereto. This arrangement is predetermined, as hereinafter described, for the purpose of aiding the user in making a calculation for the most effective use of the washer unit of FIG. 1.

The circular dial member 29 is provided centrally with an upstanding finger grip member 38 (FIG. 4) of a size adapted to be gripped by, for example, the thumb and forefinger of the user, so that the dial member 29 can be rotated over and relative to the cover face 31. Referring to FIG. 2, it is seen that the outer peripheral flange 39 of the dial member 29 extends radially over so as to cover all of the temperature indicia and the solvent indicia with the exception of two diametrically opposed, corresponding numbers, one from each group of indicia, which are exposed by means of diametrically opposed cutouts 41 and 42 formed in the peripheral edge of the dial member 29.

In use, when it is necessary or desired to fill or to inspect the reservoir 17, the cap 27 is removed by rotating it until its segmental portions 36 are free of the filler neck ears 26. Should the user decide that a commercially available solvent needs to be added to the water in filling the reservoir, the correct calculation is easily made by manipulating the dial member 29. After ascertaining the outside temperature in degrees Fahrenheit, the dial member 29 is turned until one cutout 41 is over so as to expose the temperature number closest to the actual temperature. For example, if the outside temperature was 37°, the dial member 29 would be turned until the cutout 41 exposes in a window-like manner the temperature number "40."

Then, by merely glancing at the opposite cutout 42, the solvent number exposed there would be the answer. In this calculation, the number diametrically opposite the temperature number "40" is the solvent number "2." Thus, in filling the reservoir 17 with water, two ounces of solvent would be added to ensure the most effective use of the washer unit. It should be noted here that although the corresponding numbers are diametrically opposite, their placement could be otherwise, with an appropriate change in the relation of the cutouts 41 and 42.

Although a preferred embodiment of this invention has been described herein, it is to be remembered that various modifications and alternate constructions can be made within the scope of the invention, as defined in the appended claims.

I claim:
1. An indicating device for a cleaning solvent reservoir having an open filler neck comprising, removable cap means for covering said open filler neck, said cap means including a member having a flat surface with arcuately spaced temperature and arcuately spaced solvent indicia thereon, each temperature indicium having a corresponding solvent indicium, rotatable means mounted on said member in a covering relation with said temperature indicia and said solvent indicia, and upstanding finger grip means formed on said rotatable means, said rotatable means having a pair of arcuately spaced window openings formed therein, each of said window openings being of a size to expose only one indicium and whereby said pair of window openings expose corresponding ones of said temperature indicia and said solvent indicia.

2. An indicating device for a cleaning solvent reservoir having an open filler neck comprising a circular disc for covering said filler neck, said disc having a face with arcuately spaced temperature indicia and arcuately spaced solvent indicia thereon, said temperature indicia being diametrically opposed to said solvent indicia, and a circular member rotatably mounted on said disc for rotation over the face of said disc, said member having an upstanding portion adapted for finger manipulation by the user of the indicating device for rotating said member relative to said disc, and said member having further a peripheral flange with a pair of cutouts formed diametrically therein, whereby said flange covers all of said indicia except a single temperature indicia exposed by one of said cutouts, and a single solvent indicia exposed by the other of said cutouts.

References Cited in the file of this patent
UNITED STATES PATENTS

| | | |
|---|---|---|
| 493,851 | Adsit | Mar. 21, 1893 |
| 1,931,605 | Dupus | Oct. 24, 1933 |
| 2,013,616 | Rettenmeyer | Sept. 3, 1935 |
| 2,587,147 | Guion | Feb. 26, 1952 |

FOREIGN PATENTS

| | | |
|---|---|---|
| 836,293 | Germany | Apr. 10, 1952 |